(12) United States Patent
Sakai et al.

(10) Patent No.: US 10,042,201 B2
(45) Date of Patent: Aug. 7, 2018

(54) LIQUID CRYSTAL DISPLAY DEVICE (71) Applicant: Sharp Kabushiki Kaisha, Sakai, Osaka (JP)

(72) Inventors: Akira Sakai, Sakai (JP); Hiroyuki Hakoi, Sakai (JP); Kozo Nakamura, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/529,052

(22) PCT Filed: Nov. 26, 2015

(86) PCT No.: PCT/JP2015/083164
§ 371 (c)(1),
(2) Date: May 23, 2017

(87) PCT Pub. No.: WO2016/088634
PCT Pub. Date: Jun. 9, 2016

(65) Prior Publication Data
US 2017/0261808 A1 Sep. 14, 2017

(30) Foreign Application Priority Data
Dec. 3, 2014 (JP) ................................. 2014-245270

(51) Int. Cl.
*G02F 1/1335* (2006.01)
*G02F 1/13363* (2006.01)
(Continued)

(52) U.S. Cl.
CPC .... *G02F 1/133536* (2013.01); *G02F 1/13363* (2013.01); *G02F 1/133514* (2013.01); *G02F 1/1368* (2013.01); *G02F 1/13439* (2013.01); *G02F 1/133345* (2013.01); *G02F 1/133512* (2013.01); *G02F 1/134309* (2013.01); *G02F 2001/133302* (2013.01);
(Continued)

(58) Field of Classification Search
CPC ......... G02F 1/133536; G02F 1/133514; G02F 1/13363
See application file for complete search history.

(56) References Cited

U.S. PATENT DOCUMENTS

2002/0154257 A1* 10/2002 Iijima ............... G02F 1/133514
349/67
2005/0179371 A1* 8/2005 Broer ................. H01L 51/5281
313/506

FOREIGN PATENT DOCUMENTS

JP 2000-131680 A 5/2000

\* cited by examiner

*Primary Examiner* — James Dudek
(74) *Attorney, Agent, or Firm* — ScienBiziP, P.C.

(57) ABSTRACT

The present invention provides a liquid crystal display device having a high transmittance and excellent visibility in a bright place. The liquid crystal display device of the present invention includes, in the given order, a backlight, a first circular polarizer, a liquid crystal panel, and a second circular polarizer. The first circular polarizer is a reflective circular polarizer including a reflective linear polarizer and a λ/4 plate disposed adjacent to the reflective linear polarizer. The liquid crystal display device satisfies (1) the liquid crystal panel is provided with color filters of two or more colors and has an aperture ratio lower than 43%, or (2) the liquid crystal panel is provided with no color filter and has an aperture ratio of 39% or lower.

7 Claims, 7 Drawing Sheets

(51) Int. Cl.
   *G02F 1/1333* (2006.01)
   *G02F 1/1368* (2006.01)
   *G02F 1/1343* (2006.01)
(52) U.S. Cl.
   CPC ............ *G02F 2001/133531* (2013.01); *G02F 2001/133541* (2013.01); *G02F 2001/133638* (2013.01); *G02F 2203/01* (2013.01); *G02F 2203/02* (2013.01); *G02F 2413/01* (2013.01); *G02F 2413/05* (2013.01)

Fig. 1

Recylcing effect achieved

LIQUID CRYSTAL DISPLAY DEVICE

TECHNICAL FIELD

The present invention relates to liquid crystal display devices. The present invention specifically relates to a liquid crystal display device suitable as a display device for mobile devices.

BACKGROUND ART

Liquid crystal display devices including a liquid crystal panel have a small size and a light weight, as well as low power consumption, and thus are used in a wide variety of fields.

For example, Patent Literature 1 discloses a semi-transmissive and semi-reflective liquid crystal display device utilizing circularly polarized light to control the amount of light passed therethrough, wherein a reflective circular polarizer layer is disposed between a semi-transmissive and semi-reflective film and a surface through which the light from a back-side illuminating device is emitted.

CITATION LIST

Patent Literature

Patent Literature 1: JP 2000-131680 A

SUMMARY OF INVENTION

Technical Problem

Circular polarizers are known to have an effect of preventing unnecessary reflection in liquid crystal panels, and thus can effectively improve the visibility in a bright place. In general, liquid crystal panels provided with a circular polarizer is known to have a higher mode efficiency than liquid crystal panels provided with a linear polarizer. Thus, such liquid crystal panels provided with a circular polarizer draw attention as display panels for mobile devices (e.g., smartphones and tablets) requiring both low power consumption and high luminance.

Assuming that there is no difference in the mode efficiency, liquid crystal panels provided with a circular polarizer unfortunately have a lower transmittance than liquid crystal panels provided with a linear polarizer. Still, this fact is not well known. In particular, the higher the panel definition is, the lower the transmittance of a liquid crystal panel provided with a circular polarizer is relative to that of a liquid crystal panel provided with a linear polarizer. This means a circular polarizer may possibly cause a bottleneck in the development of high-definition panels for mobile devices. Accordingly, liquid crystal display devices including a circular polarizer can be improved in transmittance (light use efficiency). One cause thereof is described below.

There are various reflectors inside a liquid crystal panel. Two typical examples thereof are transparent electrodes (typically indium tin oxide (ITO)) and metal portions of a thin film transistor (TFT) substrate. The latter causes more reflection. Most parts of the transparent electrodes are located in opening regions, while most parts of the metal portions are located in a non-opening region.

Typically, a light-shielding band called a black matrix (black mask) is disposed above the viewer side of the metals in the non-opening region. Thus, reflection (so-called unnecessary reflection) when a liquid crystal panel is viewed from the viewer side is not due to the non-opening region but due to the opening regions, and the degree thereof is relatively low. Nevertheless, such unnecessary reflection may cause a reduction in the visibility in a bright place (the contrast in a bright place), and is therefore preferably cut by the use of a circular polarizer.

In contrast, reflection when the liquid crystal panel is viewed from the backlight side is due to both the non-opening region (metals) and the opening regions, and the degree thereof is relatively high. The lower the aperture ratio is, the higher the degree of this reflection is. This reflection should not be called unnecessary reflection unlike the case where the reflection when the liquid crystal panel is viewed from the viewer side is called unnecessary reflection. This is because when the light emitted from the backlight is reflected on the liquid crystal panel, it may return toward the backlight side and then reflected on components constituting the backlight, such as a casing and a reflective sheet, possibly being utilized again. This effect is referred to as a recycling effect of recycling the light from a backlight.

Liquid crystal display devices provided with a linear polarizer can achieve the above recycling effect, but liquid crystal display devices provided with a circular polarizer, especially an absorptive circular polarizer, cannot. This is because an absorptive circular polarizer prevents any reflection without distinction between unnecessary reflection and the other reflection. The fact that the recycling effect is not achieved causes a decrease in the transmittance of a liquid crystal panel provided with a circular polarizer relative to a liquid crystal panel provided with a linear polarizer.

Figure 9:
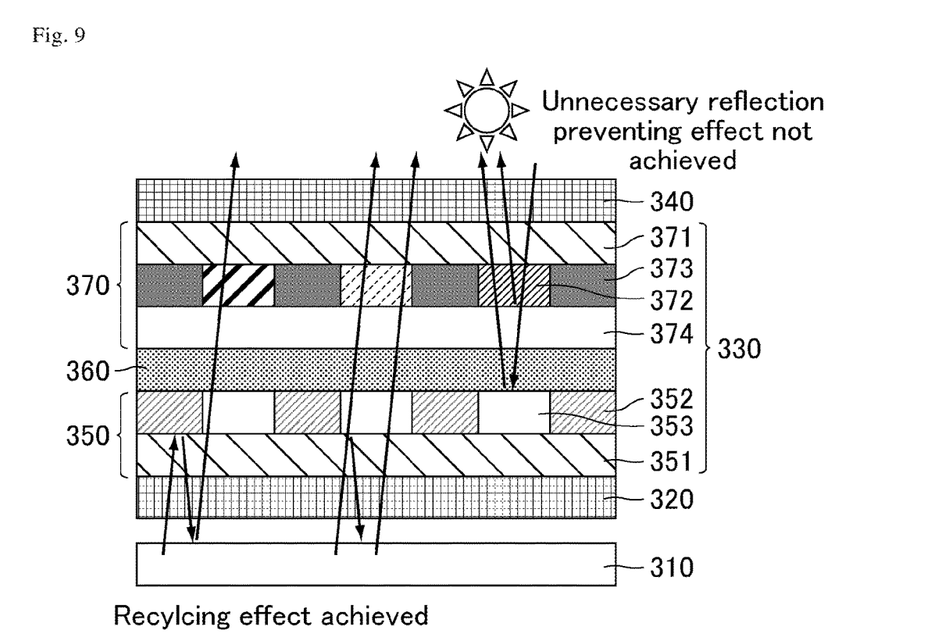
FIG. 9 is a schematic cross-sectional view of a liquid crystal display device of Comparative Embodiment 1 provided with linear polarizers.

FIG. 9 is a schematic cross-sectional view of a liquid crystal display device of Comparative Embodiment 1 provided with linear polarizers.

As illustrated in FIG. 9, the liquid crystal display device of Comparative Embodiment 1 includes, in the given order, a backlight 310, a first linear polarizer 320, a liquid crystal panel 330, and a second linear polarizer 340. The liquid crystal panel 330 includes a pair of substrates 350 and 370 and a liquid crystal layer 360 disposed between the substrates 350 and 370. The substrate 350 includes an insulating substrate 351, metals 352 for conductive components such as signal lines and electrodes of TFT elements, and multiple transparent electrodes 353 serving as pixel electrodes. The substrate 370 includes an insulating substrate 371, color filters 372, a black matrix (black mask) 373, and a transparent electrode 374 serving as a common electrode. The liquid crystal display device of Comparative Embodiment 1 achieves the effect of recycling the light from a backlight, but fails to achieve the effect of preventing unnecessary reflection.

Figure 10:
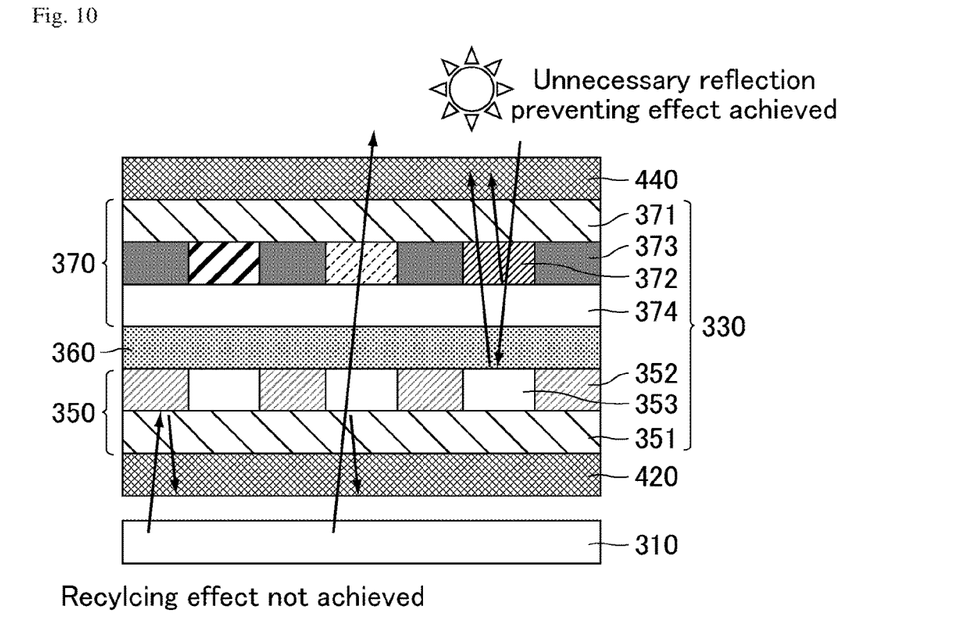
FIG. 10 is a schematic cross-sectional view of a liquid crystal display device of Comparative Embodiment 2 provided with circular polarizers.

FIG. 10 is a schematic cross-sectional view of a liquid crystal display device of Comparative Embodiment 2 provided with circular polarizers.

As illustrated in FIG. 10, the liquid crystal display device according to Comparative Embodiment 2 is substantially the same as the liquid crystal display device of Comparative Embodiment 1 except that it includes a first circular polarizer 420 and a second circular polarizer 440 instead of the first linear polarizer 320 and the second linear polarizer 340. The circular polarizers 420 and 440 are absorptive circular polarizers. The liquid crystal display device of Comparative Embodiment 2 achieves the effect of preventing unnecessary reflection, but fails to achieve the effect of recycling the light from a backlight.

When light from the outside is incident from the viewer side on the liquid crystal display device of Patent Literature 1, especially the liquid crystal display device of Example 2, in a state of displaying a black screen, some components of the light reflected on the semi-transmissive and semi-reflective film (electrode) are absorbed by a viewer-side linear polarizing film as designed. In contrast, the other components of the light passing through the semi-transmissive and semi-reflective film (electrode) are reflected on a reflective linear polarizing film, and then not absorbed by the viewer-side linear polarizing film but emitted toward the viewer side, serving as unnecessary reflection. Also in this case, a reduction in the visibility in a bright place becomes an issue. One cause thereof is specifically described below.

Figure 11:
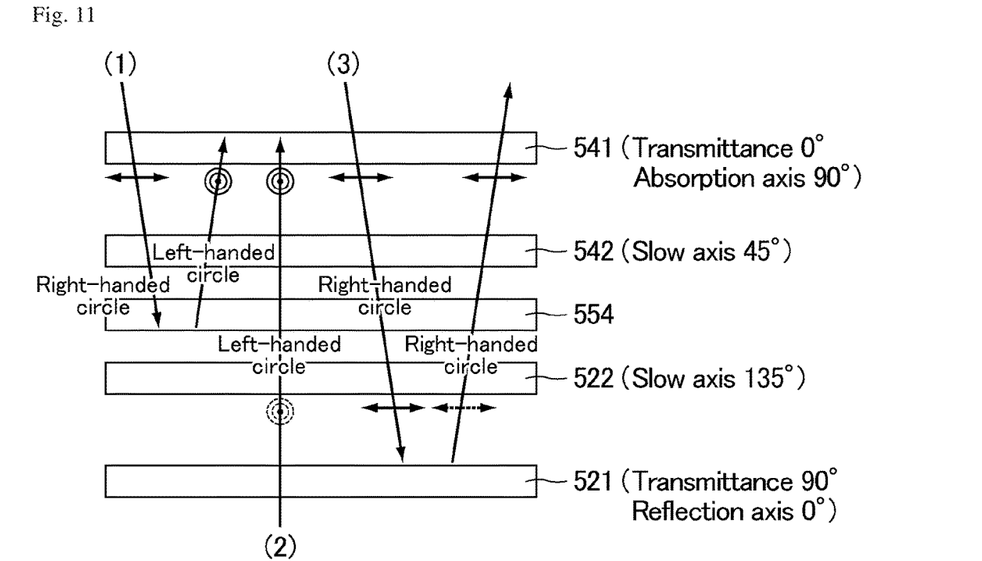
FIG. 11 is a schematic cross-sectional view of a liquid crystal display device of Comparative Embodiment 3 based on the teaching of Patent Literature 1.

FIG. 11 is a schematic cross-sectional view of a liquid crystal display device of Comparative Embodiment 3 based on the teaching of Patent Literature 1.

As illustrated in FIG. 11, the liquid crystal display device of Comparative Embodiment 3 is a semi-transmissive and semi-reflective liquid crystal display device and includes, in the given order from the back side, a reflective linear polarizing film 521, a retardation film 522 serving as a λ/4 plate, a semi-transmissive and semi-reflective film 554, a retardation film 542 serving as a λ/4 plate, and a linear polarizing film 541. The axes of the films are designed as described in FIG. 11.

In the liquid crystal display device of Comparative Embodiment 3 displaying a black screen, the light incident from the outside, as indicated by a light beam (1), passes through the linear polarizing film 541 and the linearly polarized light at an azimuth angle of 0° alone travels into the liquid crystal display device. Next, the light is converted into right-handed circularly polarized light by the retardation film 542, and then reflected on the semi-transmissive and semi-reflective film 554 and thereby converted into left-handed circularly polarized light. Thereafter, the light is converted into linearly polarized light at an azimuth angle of 90° by the retardation film 542 and absorbed by the linear polarizing film 541 with a transmission axis of 0° (absorption axis of 90°). As mentioned above, this liquid crystal display device is designed so as not to emit the outside light toward the viewer side.

The light emitted from the backlight to the liquid crystal panel, as indicated by a light beam (2), passes through the reflective linear polarizing film 521 and the linearly polarized light at an azimuth angle of 90° alone travels into the liquid crystal display device. Next, the light is converted into left-handed circularly polarized light by the retardation film 522, and passes through the semi-transmissive and semi-reflective film 554. Thereafter, the light is converted into linearly polarized light at an azimuth angle of 90° by the retardation film 542 and absorbed by the linear polarizing film 541 with a transmission axis of 0° (absorption axis of 90°). As mentioned above, this liquid crystal display device is designed so as not to emit the light from the backlight toward the viewer side.

The outside light passing through the semi-transmissive and semi-reflective film 554 and reflected on the reflective linear polarizing film 521, as indicated by a light beam (3), is not absorbed by the linear polarizing film 541 but is emitted toward the viewer side. Although the polarization states after the light passes through the respective films may be described as in the cases of the light beams (1) and (2), this case can be more intuitively understood only by looking at the polarization state indicated by a dashed line in FIG. 11. In other words, since the reflective linear polarizing film 521 has a reflection axis of 0°, the outside light reflected thereon is converted into linearly polarized light at an azimuth angle of 0°. In comparison with the light beam (2) illustrated on the left side, the polarization states of the light beams (2) and (3) are perpendicular to each other at this timing. Since the light beam (2) is absorbed by the linear polarizing film 541 in the end, then the light beam (3) is not absorbed by the linear polarizing film 541 but passes through the linear polarizing film 541 in the end.

The present invention is devised in view of the above state of the art, and aims to provide a liquid crystal display device having a high transmittance and excellent visibility in a bright place.

Solution to Problem

One aspect of the present invention may be a liquid crystal display device including, in the given order, a backlight, a first circular polarizer, a liquid crystal panel provided with color filters of two or more colors, and a second circular polarizer, the first circular polarizer being a reflective circular polarizer including a reflective linear polarizer and a λ/4 plate disposed adjacent to the reflective linear polarizer, the liquid crystal panel having an aperture ratio lower than 43%.

Hereinafter, this liquid crystal display device is also referred to as a first liquid crystal display device of the present invention.

Another aspect of the present invention may be a liquid crystal display device including, in the given order, a backlight, a first circular polarizer, a liquid crystal panel provided with no color filter, and a second circular polarizer, the first circular polarizer being a reflective circular polarizer including a reflective linear polarizer and a λ/4 plate disposed adjacent to the reflective linear polarizer, the liquid crystal panel having an aperture ratio of 39% or lower.

Hereinafter, this liquid crystal display device is also referred to as a second liquid crystal display device of the present invention.

Preferred embodiments of the first and second liquid crystal display devices of the present invention are described below. Any of the following preferred embodiments may appropriately be combined with each other. An embodiment which is a combination of any two or more of the following preferred embodiments is also one preferred embodiment.

The liquid crystal panel may operate in a transmissive display mode.

The second circular polarizer may be an absorptive circular polarizer.

Advantageous Effects of Invention

The present invention can provide a liquid crystal display device having a high transmittance and excellent visibility in a bright place.

DESCRIPTION OF EMBODIMENTS

Embodiments and examples of the present invention will be described in the following referring to the drawings, but the present invention is not limited to these embodiments and examples. The configurations of the embodiments and examples may appropriately be combined or modified within the spirit of the present invention. In the respective drawings, the components having the same function have the same reference numerals.
(Embodiment 1)

Figure 1:
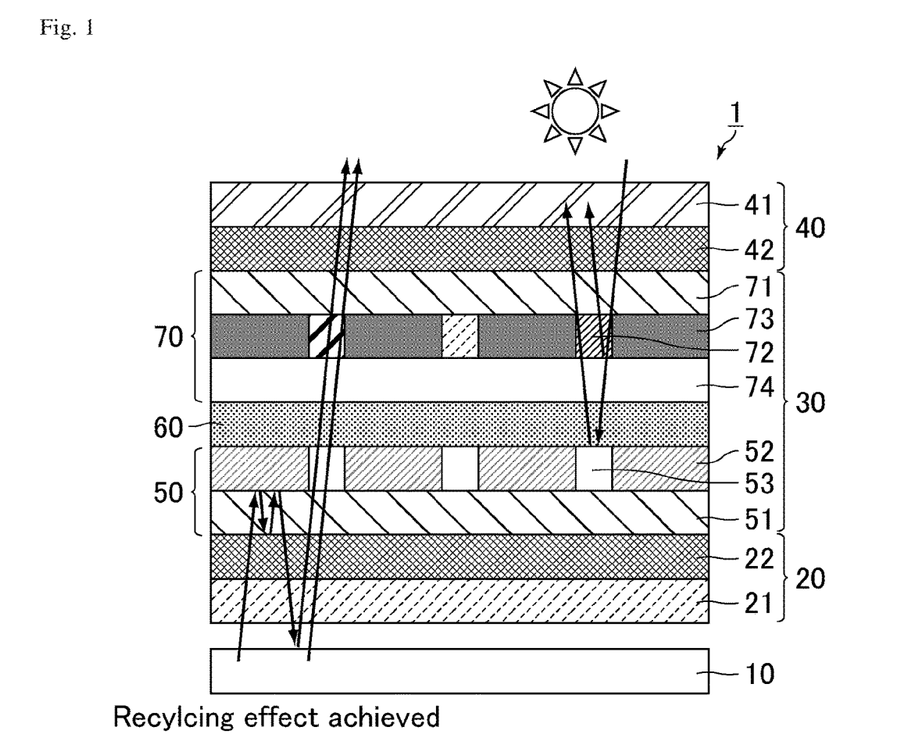
FIG. 1 is a schematic cross-sectional view of a liquid crystal display device of Embodiment 1.

FIG. 1 is a schematic cross-sectional view of a liquid crystal display device of Embodiment 1.

As illustrated in FIG. 1, a liquid crystal display device 1 of the present embodiment includes, in the given order, a backlight 10, a first circular polarizer 20, a liquid crystal panel 30 provided with color filters 72 of two or more colors, and a second circular polarizer 40. The first circular polarizer 20 is a reflective circular polarizer including a reflective linear polarizer 21 and a λ/4 plate 22 disposed adjacent to the reflective linear polarizer 21. The liquid crystal panel 30 has an aperture ratio lower than 43%.

The backlight 10, the first circular polarizer 20, the liquid crystal panel 30, and the second circular polarizer 40 are disposed in the given order from the back side to the viewer side.

Conventional backlight-side circular polarizers are absorptive circular polarizers including an absorptive linear polarizer and a λ/4 plate disposed adjacent to the absorptive linear polarizer. In contrast, the first circular polarizer 20 of the present embodiment is a reflective circular polarizer including the reflective linear polarizer 21 and the λ/4 plate 22 disposed adjacent to the reflective linear polarizer 21 (hereinafter, this configuration is referred to as Configuration (1)).

The term "reflective linear polarizer" herein means an element that transmits light in a first polarized state and reflects light in a second polarized state that is perpendicular to the first polarized state. Light in the first polarized state vibrates in a direction parallel to the transmission axis of the reflective linear polarizer, while light in the second polarized state vibrates in a direction perpendicular to the transmission axis of the reflective linear polarizer. The reflective linear polarizer can split polarized light by a mechanism different from that of an absorptive linear polarizer that absorbs light in the second polarized state.

The term "λ/4 plate" herein means a layer having an in-plane retardation R of 100 nm or higher and 170 nm or lower (preferably 120 nm or higher and 150 nm or lower, more preferably 125 nm or higher and 145 nm or lower) at least relative to the light with a wavelength of 550 nm.

The term "in-plane retardation R" herein means a retardation (unit: nm, absolute value) represented by $R=|n_x-n_y| \times d$, wherein $n_x$ and $n_y$ represent the principal refractive indices in the in-plane direction of a birefringent layer (e.g., a liquid crystal panel or a λ/4 plate); $n_z$ represents the principal refractive index in the out-of-plane direction (thickness direction) of the birefringent layer; and d represents the thickness of the birefringent layer.

The in-plane retardation R, the principal refractive indices, the optical axes (slow axis and fast axis) of each birefringent layer, the transmission axis of each polarizer, and the absorption axis or reflection axis of each polarizer can be determined using a dual-rotating retarder polarimeter (trade name: Axo-scan, Axometrics, Inc.). The in-plane retardation R can be determined using measurement light with a wavelength of 550 nm in the normal direction of the birefringent layer.

The phrase "a λ/4 plate is disposed adjacent to the linear polarizer (either a reflective linear polarizer or an absorptive linear polarizer)" herein means no optical element such as a light absorber and a birefringent medium is disposed between the linear polarizer and the λ/4 plate. This phrase includes the cases where a joint component such as adhesive (including pressure-sensitive adhesive) is disposed between the linear polarizer and the λ/4 plate. Examples of the light absorber include absorptive linear polarizers and color films, and examples of the birefringent medium include retarders.

Configuration (1) Leads to the Following Effects.

If light passing through a backlight-side circular polarizer and in the first polarized state is right-handed circularly polarized light, for example, the light emitted from the backlight usually travels toward the liquid crystal panel in the form of right-handed circularly polarized light, and then is reflected on a metal in the liquid crystal panel and converted into left-handed circularly polarized light, traveling toward the circular polarizer. Here, if the backlight-side circular polarizer is an absorptive circular polarizer, the light reflected on the metal (the left-handed circularly polarized light) is absorbed by the absorptive circular polarizer and does not return to the backlight. On the contrary, the backlight-side first circular polarizer 20 in the present embodiment is a reflective circular polarizer including the reflective linear polarizer 21 and the λ/4 plate 22 disposed adjacent to the reflective linear polarizer 21. Thus, the light emitted from the backlight 10 passes through the first circular polarizer 20 and travels toward the liquid crystal panel 30 in the form of left- or right-handed circularly polarized light (e.g., right-handed circularly polarized light), and then is reflected on the metal in the liquid crystal panel 30 and travels toward the first circular polarizer 20 in the form of circularly polarized light in the opposite rotating direction (e.g., left-handed circularly polarized light). Thereafter, this light is reflected on the first circular polarizer 20 and again travels toward the liquid crystal panel 30 in the form of circularly polarized light (e.g., left-handed circularly polarized light) in the same rotating direction. The light is again reflected on the metal to be converted into circularly polarized light in the opposite rotating direction (e.g., right-handed circularly polarized light), and then passes through the first circular polarizer 20 and returns to the backlight 10. Thereby, this configuration achieves the effect of recycling the light from a backlight.

Since the liquid crystal display device 1 of the present embodiment includes the backlight 10, the liquid crystal panel 30 operates in a transmissive or semi-reflective and semi-transmissive (transflective) display mode, preferably a transmissive mode (hereinafter, this feature is also referred to as Configuration (2)). The reason of this is described in the following.

Figure 2:
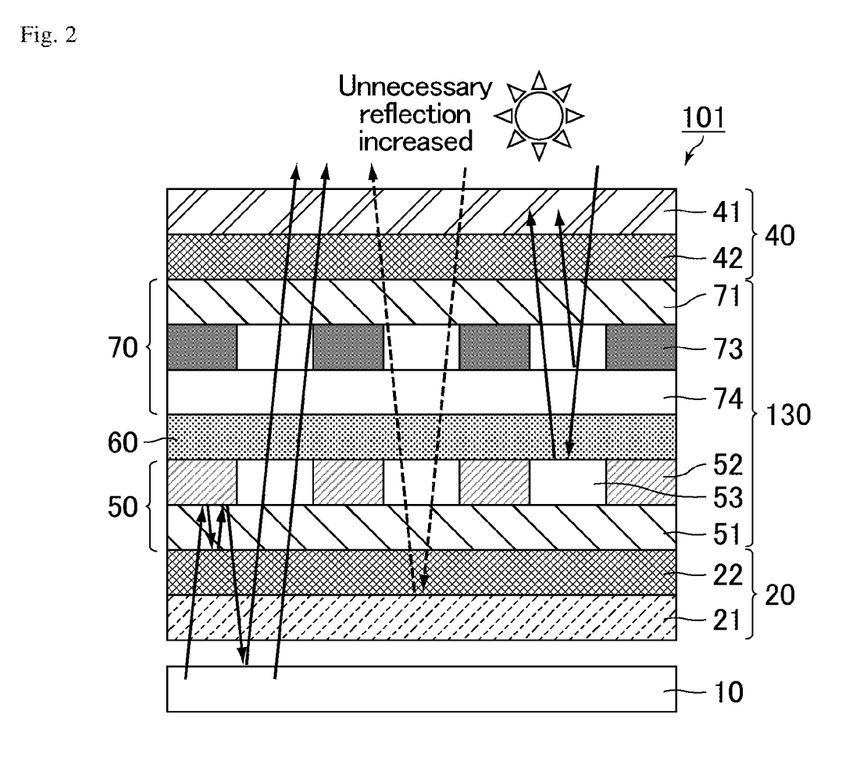
FIG. 2 is a schematic cross-sectional view of a liquid crystal display device of Comparative Embodiment 4.

FIG. 2 is a schematic cross-sectional view of a liquid crystal display device of Comparative Embodiment 4.

As illustrated in FIG. 2, a liquid crystal display device 101 of the present comparative embodiment is substantially the same as the liquid crystal display device 1 of Embodiment 1 except that it includes a liquid crystal panel 130 provided with no color filter and the liquid crystal panel 130 has an aperture ratio of 43% or higher. Thus, the liquid crystal display device 101 of the present comparative embodiment satisfies the above Configuration (1). Still, as indicated by dashed lines in FIG. 2, the liquid crystal display device 101 unfortunately suffers an increase in unnecessary reflection, causing a reduction in the visibility in a bright place (the contrast in a bright place). The reason of this is the same as in Comparative Embodiment 3 described referring to FIG. 11, i.e., the outside light reflected on the reflective linear polarizer 21 is not absorbed by the second circular polarizer 40. In particular, if the display mode of the liquid crystal panel 130 is transmissive, the actual damage becomes more serious. If the display mode of the liquid crystal panel 130 is semi-reflective and semi-transmissive, the liquid crystal panel 130 is designed so as to achieve normal display using some components of the outside light (i.e., components reflected on the semi-transmissive and semi-reflective film before reaching the reflective circular polarizer). Unlike this case, the liquid crystal panel 130 with a transmissive display mode fails to allow the outside light to normally contribute to display. In other words, the outside light never advantageously acts on display in the transmissive mode, and thus the liquid crystal panel 130 with a transmissive display mode suffers more serious actual damage. It is preferred to compensate this problem not only in the case of a transmissive mode, of course, but also in the case of a semi-reflective and semi-transmissive mode. This is one aim of Configurations (3-1) and (4-1) to be mentioned later. In other words, since the liquid crystal display device 1 of the present embodiment satisfies Configurations (3-1) and (4-1), it can improve the visibility in a bright place and, if the display mode of the liquid crystal panel 30 is a transmissive mode, it can particularly effectively achieve this improving effect.

Configuration (3-1) is that the liquid crystal panel 30 has an aperture ratio lower than 43%.

The "aperture ratio" herein means the ratio (percentage) of the area of a region where light passes (opening region) to the whole area of one pixel when a liquid crystal panel with no polarizer disposed on both the back-side surface (surface on the backlight side) and the viewer-side surface is viewed in the normal direction of the back-side surface or viewer-side surface. The area of the opening region may be calculated by subtracting the area of a region where light does not pass (non-opening region), such as a TFT element and a signal line, from the whole area of one pixel. These areas can be calculated based on a micrograph of the liquid crystal panel.

Configuration (3-1) leads to the following effects.

Figure 3:
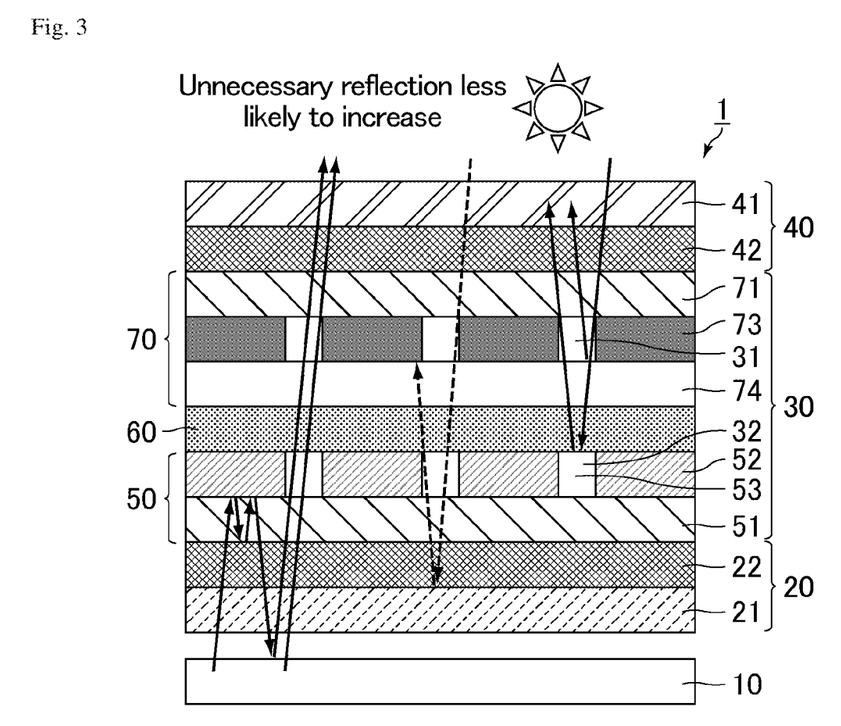
FIG. 3 is a schematic cross-sectional view of the liquid crystal display device of Embodiment 1.

FIG. 3 is a schematic cross-sectional view of the liquid crystal display device of Embodiment 1.

As illustrated in FIG. 3, the lower the aperture ratio of the liquid crystal panel 30, the lower the possibility that the outside light incident from the viewer side passes through the opening regions (both opening regions 31 of the viewer-side substrate and opening regions 32 of the back-side substrate) of the liquid crystal panel 30 and is then reflected on the first circular polarizer 20, and further returns to the opening regions 31 of the viewer-side substrate. As illustrated in FIG. 3, if the outside light reflected on the first circular polarizer 20 fails to return to the opening region 31 of the viewer-side substrate, this light is absorbed by light absorbers such as a black matrix, and thus does not return to the viewer side. In other words, substantially no unnecessary reflection is observed. Although not illustrated so as to avoid complication, there are components which are reflected on the first circular polarizer 20, then reflected on the metals 52 disposed in the non-opening region so that the traveling direction is changed toward the backlight 10, and thus do not return to the viewer side. Accordingly, setting the aperture ratio of the liquid crystal panel 30 to a low value, specifically lower than 43%, enables a reduction in unnecessary reflection due to the back-side first circular polarizer 20.

Configuration (4-1) is that the liquid crystal panel 30 includes color filters 72 of two or more colors.

Configuration (4-1) leads to the following effects.

Figure 4:
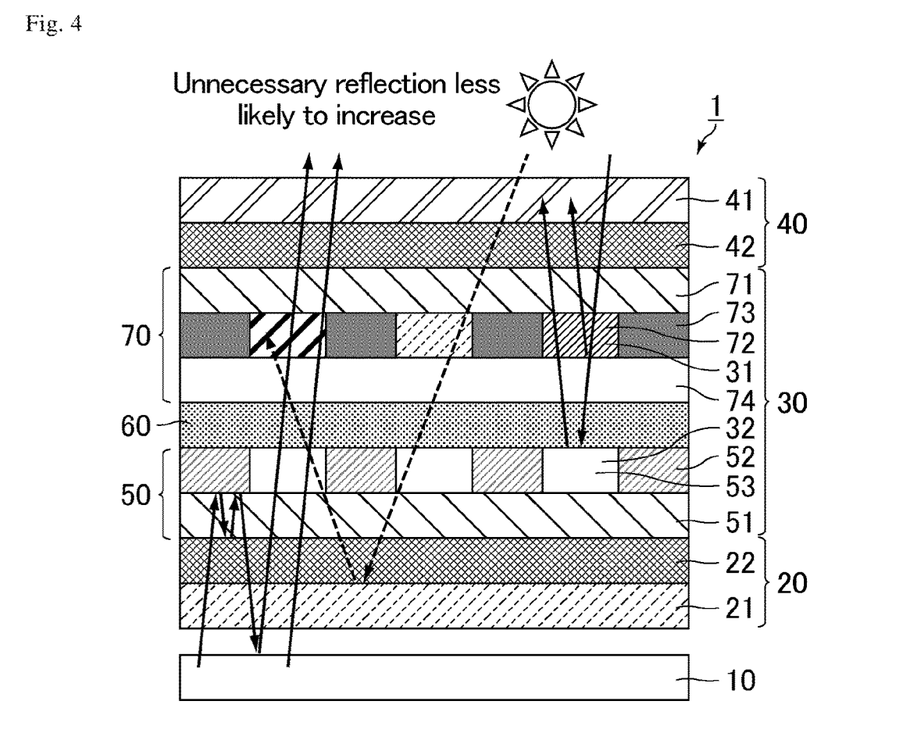
FIG. 4 is a schematic cross-sectional view of the liquid crystal display device of Embodiment 1.

FIG. 4 is a schematic cross-sectional view of the liquid crystal display device of Embodiment 1.

As illustrated in FIG. 4, in comparison with the case of the liquid crystal panel 30 provided with no color filters of two or more colors, the liquid crystal panel 30 provided with the color filters 72 of two or more colors leads to a lower possibility that the outside light incident from the viewer side passes through the opening regions (both the opening regions 31 of the viewer-side substrate and the opening regions 32 of the back-side substrate) of the liquid crystal panel 30 and is then reflected on the first circular polarizer 20, and further passes through the opening regions 31 of the viewer-side substrate, causing unnecessary reflection. This is because as follows. As in the case of the optical path indicated by dashed lines in FIG. 4, if one color filter 72 of one opening region 31 through which the light first passes and another color filter 72 of another opening region 31 to which the light reflected on the first circular polarizer 20 returns have different colors, the light reflected on the first circular polarizer 20 cannot pass through the color filter 72 of the different color. For example, the light passing through a green filter (green light) can pass through another green filter having the same color, but cannot pass through a filter of a different color, such as red or blue. Accordingly, the liquid crystal panel 30 provided with the color filters 72 of two or more colors enables a reduction in unnecessary reflection due to the back-side first circular polarizer 20.

Since the present embodiment satisfies both Configurations (3-1) and (4-1), it can particularly effectively achieve the effect of reducing unnecessary reflection.

The present embodiment may satisfy any other appropriate configurations in addition to Configurations (1), (3-1), and (4-1).

(Backlight)

The backlight 10 may be a common backlight, and may be of direct type or edge type. The light source of the backlight 10 may be a common backlight light source, such as a LED or a cold cathode tube.

(First Circular Polarizer)

The reflective linear polarizer 21 may be a common film. One specific example thereof is a film obtainable by stretching an ultra-multilayer film composed of two polymer films stacked alternately (e.g., DBEF film, 3M Co.).

The λ/4 plate 22 may be a common film. Specific examples thereof include films obtainable by aligning the molecules of polycarbonate, polyarylate, polysulfone, or nothomene by, for example, stretching the material film; and films obtainable by immobilizing a liquid crystal compound in an aligned state by, for example, crosslinking the material film.

The λ/4 plate 22 is disposed between the reflective linear polarizer 21 and the liquid crystal panel 30, and converts the linearly polarized light passing through the reflective linear polarizer 21 into left- or right-handed circularly polarized light. In a plan view, the in-plane slow axis of the λ/4 plate 22 preferably forms an angle of 40° to 50°, more preferably 43° to 47°, particularly preferably 44° to 46°, with the transmission axis of the reflective linear polarizer 21.

(Color Filter)

The color filters 72 of two or more colors are disposed correspondingly to subpixels of two or more colors. Each color filter is disposed so as to cover the opening region (region where light passes) of the corresponding subpixel. Each subpixel is provided with a color filter 72 of a single color, and subpixels of two or more colors constitute a pixel. This structure enables color display. Examples of combination of two or more colors include three colors of red (R), green (G). and blue (B), three colors of cyan (C), magenta (M), and yellow (Y), four colors of R, G, B, and Y, four colors of R, G, B, and white (W), and six colors of R, G, B, C, M, and Y. The material of each color filter 72 may be one obtainable by dispersing a pigment in a transparent resin such as acrylic resin.

(Liquid Crystal Panel)

The aperture ratio of the liquid crystal panel 30 may be any value that is lower than 43%, and is preferably 34% or lower, more preferably 23% or lower. In the present embodiment, setting the aperture ratio to 34% or lower and to 23% or lower respectively enables the internal reflectance to be substantially half or less and to be substantially ¼ or less the internal reflectance in the case of using absorptive linear polarizers instead of using the circular polarizers 20 and 40.

The lower limit of the aperture ratio of the liquid crystal panel 30 may be any value, and is preferably 5% or higher, more preferably 10% or higher, particularly preferably 15% or higher.

The liquid crystal panel 30 may be any one capable of providing display using a pair of circular polarizers. For example, it may include a pair of substrates 50 and 70 facing each other and a liquid crystal layer 60 disposed between the substrates 50 and 70. The liquid crystal panel 30 may be a vertical alignment-mode (VA-mode) liquid crystal panel which displays a black screen with the liquid crystal molecules in the liquid crystal layer 60 being aligned substantially perpendicularly to the surfaces of the substrates 50 and 70. Examples of the VA mode include a multi-domain VA (MVA) mode, a continuous pinwheel alignment (CPA) mode, a patterned VA (PVA) mode, a biased VA (BVA) mode, a reverse TN (RTN) mode, and an in plane switching-VA (IPS-VA) mode. The phrase "liquid crystal molecules being aligned substantially perpendicularly to the surfaces of the substrates" herein means that the pre-tilt angle of the liquid crystal molecules may be 80° or greater. Alternatively, the liquid crystal panel 30 may be a horizontal alignment-mode liquid crystal panel in which the optical parameters such as retardation and twist angle are appropriately controlled so as to provide display using a pair of circular polarizers. In this case, the liquid crystal panel 30 may display a black screen with the liquid crystal molecules in the liquid crystal layer 60 being aligned substantially parallel to the surfaces of the substrates 50 and 70. The phrase "liquid crystal molecules being aligned substantially parallel to the surfaces of the substrates" herein means that the pre-tilt angle of the liquid crystal molecules may be 10° or smaller. Examples of the horizontal alignment mode include an in plane switching (IPS) mode and a fringe field switching (FFS) mode.

The substrate 50 disposed on the back side, i.e., between the liquid crystal layer 60 and the first circular polarizer 20 includes a transparent insulating substrate 51 such as a glass substrate. On the liquid crystal layer 60 side surface of the insulating substrate 51 are disposed components such as multiple TFT elements (not illustrated) serving as switching elements, the metals 52 for conductive components such as signal lines and electrodes of TFT elements, multiple transparent electrodes 53 serving as pixel electrodes, and a first alignment film (not illustrated) which aligns the liquid crystal molecules substantially perpendicularly to the surface of the substrate 50 with no voltage applied. Each subpixel is provided with at least one TFT element and at least one transparent electrode 53. The metals 52 are disposed in a non-opening region such as a boundary region between subpixels. The first alignment film is disposed so as to cover all the pixels, i.e., the entire display region.

Each TFT element includes a semiconductor layer, a gate insulator, and a gate electrode, source electrode, and drain electrode serving as parts of the metals 52. Examples of the signal lines include gate bus lines for connecting the TFT elements to a gate driver, source bus lines for connecting the TFT elements to a source driver, and storage capacitance lines (Cs lines) for applying a common voltage to multiple subpixels. Examples of the material of the metals 52 include aluminum, titanium, and copper. Examples of the material of the transparent electrodes 53 include transparent conductive materials such as ITO and indium zinc oxide (IZO). One example of the material of the first alignment film is polyimide.

The substrate 70 disposed on the viewer side, i.e., between the liquid crystal layer 60 and the second circular polarizer 40, include a transparent insulating substrate 71 such as a glass substrate. On the liquid crystal layer 60 side surface of the insulating substrate 71 are disposed components such as color filters 72, a black matrix (black mask) 73 serving as a light-shielding component, a transparent electrode 74 serving as a common electrode, and a second alignment film (not illustrated) which aligns the liquid crystal molecules substantially perpendicularly to the surface of the substrate 70 with no voltage applied. The black matrix 73 is disposed in a non-opening region such as a boundary region between subpixels. The second alignment film is disposed so as to cover all the pixels, i.e., the entire display region.

Examples of the material of the black matrix 73 include non-transparent metal materials (e.g., chromium) and those obtainable by dispersing a black pigment (e.g., carbon black) in a transparent resin such as acrylic resin. Examples of the material of the transparent electrode 74 include transparent conductive materials such as ITO and IZO. One example of the material of the second alignment film is polyimide.

The color filters 72 may be disposed not on the viewer-side substrate 70 but on the back-side substrate 50.

(Second Circular Polarizer)

The second circular polarizer 40 is preferably an absorptive circular polarizer including an absorptive linear polarizer 41 and a λ/4 plate 42 disposed adjacent to the absorptive linear polarizer 41. This more surely enables prevention of reflection of the outside light than in the case of using a reflective circular polarizer as the second circular polarizer 40. When a reflective circular polarizer is used as the second circular polarizer 40, the outside light is not emitted toward the viewer side by the first reflection, and it is not absorbed by the second circular polarizer 40 but reflected thereon to return into the liquid crystal panel 30. Thus, in the course of repeated reflection of the light and repeated variation of the polarized state thereof some times in the liquid crystal panel 30, it may unfortunately be emitted toward the viewer side as unnecessary reflected light.

The term "absorptive linear polarizer" herein means an element that transmits light in a first polarized state and absorbs light in a second polarized state that is perpendicular to the first polarized state. Light in the first polarized state vibrates in a direction parallel to the transmission axis of the absorptive linear polarizer, while light in the second polarized state vibrates in a direction perpendicular to the transmission axis of the absorptive linear polarizer.

The absorptive linear polarizer 41 may be a common film. It may specifically be a polarizing film obtainable by stretching a polyvinyl alcohol (PVA) film adsorbing an anisotropic material such as a dichroic iodine complex. In order to ensure the mechanical strength and the moist heat resistance, the absorptive linear polarizer 41 usually further includes a protecting film such as a triacetyl cellulose (TAC) film attached to each of the surfaces of the polarizing film using adhesive.

The λ/4 plate 42 may be a common film. Specific examples thereof include films obtainable by aligning the molecules of polycarbonate, polyarylate, polysulfone, or norbomene by, for example, stretching the material film; and films obtainable by immobilizing a liquid crystal compound in an aligned state by, for example, crosslinking the material film.

The λ/4 plate 42 is disposed between the absorptive linear polarizer 41 and the liquid crystal panel 30, and converts the linearly polarized light passing through the absorptive linear polarizer 41 into left- or right-handed circularly polarized light. In a plan view, the in-plane slow axis of the λ/4 plate 42 preferably forms an angle of 40° to 50°, more preferably 43° to 47°, particularly preferably 44° to 46°, with the transmission axis of the absorptive linear polarizer 41. In a plan view, the in-plane slow axis of the λ/4 plate 42 is substantially perpendicular to the in-plane slow axis of the λ/4 plate 22. More specifically, in a plan view, the in-plane slow axis of the λ/4 plate 42 and the in-plane slow axis of the λ/4 plate 22 form an angle of 80° to 100° (preferably 85° to 95°, more preferably 88° to 92°).

The first circular polarizer 20 and the second circular polarizer 40 may be disposed in parallel-Nicols, but is usually disposed in crossed Nicols. In other words, in a plan view, the transmission axis of the reflective linear polarizer 21 and the transmission axis of the absorptive linear polarizer 41 may be substantially parallel to each other, but are usually substantially perpendicular to each other in a plan view. In the latter case, more specifically, the transmission axis of the reflective linear polarizer 21 and the transmission axis of the absorptive linear polarizer 41 usually form an angle of 80° to 100° (preferably 85° to 95°, more preferably 88° to 92°) in a plan view.

(Evaluation 1)

Four liquid crystal panels (first to fourth liquid crystal panels) having different aperture ratios and panel transmittances were prepared as shown in the following Table 1. The first to fourth liquid crystal panels are each provided with color filters of three colors R, G, and B. The aperture ratios and panel transmittances thereof were as shown in Table 1, which were different from each other.

TABLE 1

| Liquid crystal panel | Aperture ratio (%) | Color filters | Panel transmittance (%) |
|---|---|---|---|
| 1 | 55 | Present | 15.8 |
| 2 | 43 | Present | 12.7 |
| 3 | 31 | Present | 7.8 |
| 4 | 19 | Present | 4.7 |

In each evaluation test, the aperture ratio was calculated from the whole area of one pixel and the area of the opening region in a micrograph of the liquid crystal panel.

The term "panel transmittance" herein means the transmittance of a liquid crystal panel with no polarizer attached to both the back-side surface and the viewer-side surface. For liquid crystal panels provided with color filters, as in the case of Embodiment 1, the panel transmittance is a value close to the product of the aperture ratio and the transmittances of the color filters.

In each evaluation test, the transmittances (including the panel transmittance) were calculated as follows. First, a liquid crystal display device (trade name: LC-20F5, Sharp Corp.) was disassembled and the backlight unit was isolated as a light source. Then, the luminance of the illuminating surface of the backlight was measured using a spectroradiometer (trade name: SR-UL1, Topcon Corp.). Next, a liquid crystal panel with a predetermined polarizer(s) attached thereto or a liquid crystal panel with no polarizer attached thereto was placed on the backlight. The liquid crystal panel was then driven to display a white screen, and the luminance of the display region of the liquid crystal panel was measured with the backlight emitting light. Then, the ratio (percentage) between these luminances was calculated as the transmittance.

Figure 5:
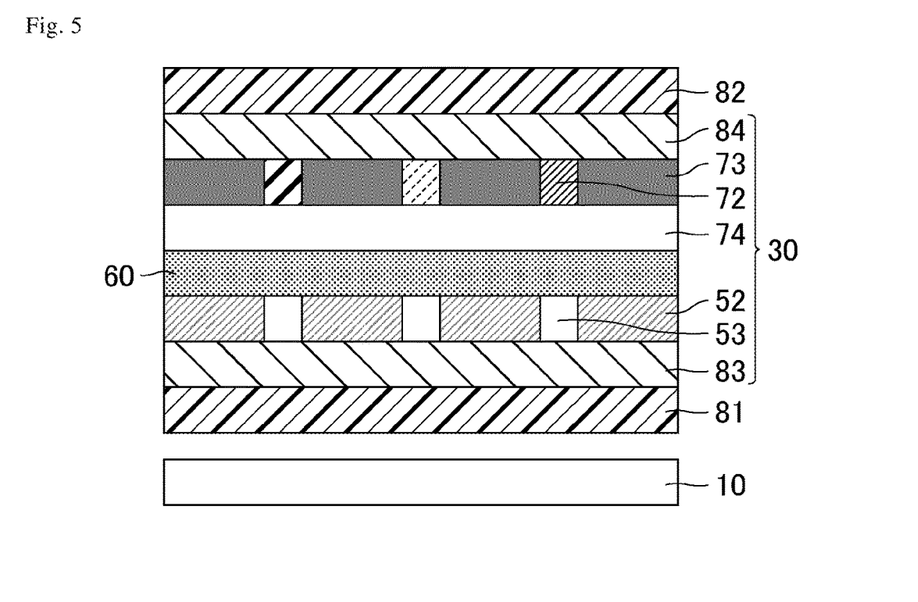
FIG. 5 is a schematic cross-sectional view of a liquid crystal display device used in Evaluation 1.

FIG. 5 is a schematic cross-sectional view of a liquid crystal display device used in Evaluation 1.

First to fourth liquid crystal panels 30 are VA-mode transmissive liquid crystal panels. As illustrated in FIG. 5, each included a glass substrate (also referred to as a back-side substrate) 83 provided with multiple TFT elements (not illustrated), metals 52 for conductive components such as signal lines and electrodes of the TFT elements, and multiple transparent electrodes 53 serving as pixel electrodes; a glass substrate (also referred to as a viewer-side substrate) 84 provided with color filters 72 of three colors R, G, and B, a black matrix 73, and a transparent electrode 74 serving as a common electrode; and a liquid crystal layer 60 sealed between the viewer-side substrate 83 and the back-side substrate 84. Although not illustrated, the liquid crystal panels 30 each included, on the liquid crystal layer 60 side surface of each of the substrates 83 and 84, an alignment film which aligns the liquid crystal molecules in the liquid crystal layer 60 substantially perpendicularly to the surface of the corresponding substrate 83 or 84 with no voltage applied.

A polarizer 81 and a polarizer 82 were respectively attached to the back-side surface and the viewer-side surface of each liquid crystal panel 30, and then the workpiece was assembled with the backlight 10. Finally, 12 liquid crystal display devices for evaluation tests (2 devices as examples and 10 devices as comparative examples) were produced. Each liquid crystal display device included, in the given order from the back side to the viewer side, the backlight 10, a first circular polarizer or a first absorptive linear polarizer serving as the back-side polarizer 81, one of the first to fourth liquid crystal panels 30, and a second circular polarizer or a second absorptive linear polarizer serving as the viewer-side polarizer 82.

The first circular polarizer used was a reflective circular polarizer or an absorptive circular polarizer, and the second circular polarizer used was an absorptive circular polarizer. The reflective circular polarizer includes a reflective linear polarizer and a λ/4 plate disposed adjacent to the reflective linear polarizer. It was attached to the liquid crystal panel 30 such that the λ/4 plate was placed between the reflective linear polarizer and the liquid crystal panel 30. The reflective linear polarizer used was DBEF film (3M Co.). The absorptive circular polarizer includes an absorptive linear polarizer and a λ/4 plate disposed adjacent to the absorptive linear polarizer. It was attached to the liquid crystal panel 30 such that the λ/4 plate was placed between the absorptive linear polarizer and the liquid crystal panel 30. The absorptive linear polarizer used was a film obtained by stretching a polyvinyl alcohol (PVA) film adsorbing a dichroic iodine complex to prepare a polarizing film and then attaching a TAC film to each of the surfaces of the polarizing film using adhesive.

The following Table 2 shows the combinations of one of the first to fourth liquid crystal panels, the back-side polarizer, and the viewer-side polarizer in the respective liquid crystal display devices.

loss. Conditions for actually achieving the maximum mode efficiency are complicated and partly depend on the design matter such as the design of polarizers. For example, in the case of a liquid crystal display device with a pair of linear polarizers disposed in crossed Nicols, the mode efficiency becomes maximum (=1) when the liquid crystal molecules of the liquid crystal layer are uniformly aligned without twisting, the alignment azimuth of the liquid crystal molecules is 45° relative to the axis azimuth of each linear polarizer, and the retardation of the liquid crystal layer is λ/2. Although there are other conditions for achieving the maximum mode efficiency (=1), the specification thereof is not described herein. In the case of a liquid crystal display device with a pair of circular polarizers disposed in crossed Nicols, the mode efficiency becomes maximum (=1) when the liquid crystal molecules of the liquid crystal layer are uniformly aligned without twisting and the retardation of the liquid crystal layer is λ/2. In this case, the aforementioned azimuth angle of 45° is not a necessary condition unlike the case of using linear polarizers. This is why a liquid crystal display device provided with a pair of circular polarizers is considered to have a higher mode efficiency than a liquid crystal display device provided with a pair of linear polarizers.

TABLE 2

| Liquid crystal panel | | Back-side polarizer | Viewer-side polarizer | Relative transmittance (%) | Internal reflectance (%) |
|---|---|---|---|---|---|
| 1 | Comparative Example 1 | Reflective circular polarizer | Absorptive circular polarizer | 100 | 3.2 |
|   | Comparative Example 1-1 | Absorptive circular polarizer | Absorptive circular polarizer | 95 | 0.1 |
|   | Comparative Example 1-2 | Absorptive linear polarizer | Absorptive linear polarizer | 100 | 1.6 |
| 2 | Comparative Example 2 | Reflective circular polarizer | Absorptive circular polarizer | 99 | 1.3 |
|   | Comparative Example 2-1 | Absorptive circular polarizer | Absorptive circular polarizer | 94 | 0.1 |
|   | Comparative Example 2-2 | Absorptive linear polarizer | Absorptive linear polarizer | 100 | 1.3 |
| 3 | Example 1 | Reflective circular polarizer | Absorptive circular polarizer | 100 | 0.6 |
|   | Comparative Example 3-1 | Absorptive circular polarizer | Absorptive circular polarizer | 88 | 0.1 |
|   | Comparative Example 3-2 | Absorptive linear polarizer | Absorptive linear polarizer | 100 | 1.5 |
| 4 | Example 2 | Reflective circular polarizer | Absorptive circular polarizer | 99 | 0.3 |
|   | Comparative Example 4-1 | Absorptive circular polarizer | Absorptive circular polarizer | 86 | 0.1 |
|   | Comparative Example 4-2 | Absorptive linear polarizer | Absorptive linear polarizer | 100 | 1.6 |

(Mode Efficiency (Polarized Light Use Efficiency))

The term "mode efficiency" herein means the value calculated by $T_{white}/(T_{parallel} \times T_{panel})$. $T_{white}$ represents the transmittance of a liquid crystal panel with a polarizer attached to both the back-side surface and the viewer-side surface in a state of displaying a white screen. $T_{parallel}$ represents the transmittance of a stack of the back-side polarizer and the viewer-side polarizer used for the measurement of $T_{white}$. It should be noted that the two polarizers are disposed in parallel Nicols in the measurement of $T_{parallel}$. $T_{panel}$ represents the aforementioned panel transmittance. The mode efficiency is a standard for measuring the level of the polarized light use efficiency of a liquid crystal panel. The mode efficiency becomes maximum (=1) when the polarized light passing through the back-side polarizer and the liquid crystal panel displaying a white screen can pass through the viewer-side polarizer without Still, in evaluating the light use efficiencies of the liquid crystal display devices of the respective examples and comparative examples in the present evaluation, the influence of the difference in mode efficiency needs to be eliminated. This is because the mode efficiency may be improved owing to originality and ingenuity regarding the design of a display mode, such as the alignment state of liquid crystal molecules and the electrode pattern, which are not related to the essential Configurations (1), (3-1), and (4-1) of the present embodiment. In other words, whether the polarizers used are linear polarizers or circular polarizers, the development for achieving the maximum mode efficiency (=1) may be continued, finally leading to no difference in mode efficiency between the use of linear polarizers and the use of circular polarizers. In preparation for such an event, the effects owing to the essential configurations of the present embodiment alone need to be evaluated properly. This is why the influence of the mode efficiency is preferably eliminated. In order to achieve this, a method may be used in which the mode efficiency is actually measured and the transmittance of a liquid crystal panel is normalized using this measured value, performing a comparison. One example of more simple methods is a method of measuring the transmittance of a liquid crystal panel with a polarizer attached only to the back side and no polarizer attached to the viewer side. The evaluations herein are based on this method.

Table 2 shows the results of measuring the relative transmittances and internal reflectances of the liquid crystal display devices of the respective examples and comparative examples. The term "relative transmittance" herein means the ratio (percentage) of the transmittance of a liquid crystal display device with a polarizer attached only to the back side of the liquid crystal panel and no polarizer attached to the viewer side thereof to the transmittance (100%) of a liquid crystal display device (one with a sub number 2 of each comparative example) with an absorptive linear polarizer attached only to the back side of the liquid crystal panel and no absorptive linear polarizer attached to the viewer side thereof. Thereby, the light use efficiencies due to the effect of recycling the light from a backlight alone can be compared without the influence of the difference in mode efficiency.

The term "internal reflectance" herein means the value obtained by subtracting the surface reflectance 4% of the viewer-side polarizer used in every liquid crystal display device, i.e., an absorptive linear polarizer, from the reflectance of a liquid crystal display device with a back-side polarizer and a viewer-side polarizer attached to the liquid crystal panel. This corresponds to the reflectance of light reflected inside the liquid crystal display device. It should be noted that this internal reflection cannot be prevented by moth-eye films or anti-reflective films composed of a thin film.

The reflectance of a liquid crystal display device means the reflectance of the liquid crystal display device displaying a black screen. The measurement device used was a portable spectrophotometer (trade name: CM-2600d, Konica Minolta Japan, Inc., measurement wavelength range: 360 nm to 740 nm, integrating sphere system). The reflection measurement mode was a specular component included (SCI) mode.

Table 2 shows the liquid crystal display devices of the examples had a transmittance similar to that of the liquid crystal display devices of the comparative examples using absorptive linear polarizers, and achieved the effect of recycling the light from the backlight as in the cases of using absorptive linear polarizers. The lower the aperture ratio, the lower the internal reflectance; In the case of using the second liquid crystal panel having an aperture ratio of 43%, the internal reflectance of the liquid crystal display device using a reflective circular polarizer was identical with the internal reflectance of the liquid crystal display device using absorptive linear polarizers (see Comparative Example 2 and Comparative Example 2-2). Thus, the evaluation demonstrated that setting the aperture ratio of a liquid crystal panel provided with color filters to lower than 43% enabled the internal reflection of a liquid crystal display device using a reflective circular polarizer to be lower than the internal reflection of a liquid crystal display device using absorptive linear polarizers. In particular, Example 2 using the fourth liquid crystal panel provided with color filters of two or more colors and having an aperture ratio as low as 19% showed a very small increment in internal reflectance even in comparison with Comparative Example 4-1, achieving excellent visibility in a bright place. As a result, the liquid crystal display device of the present embodiment can improve the light use efficiency of a liquid crystal display device using a circular polarizer while minimizing an increment in internal reflection.

(Embodiment 2)

In the present embodiment, the characteristic features of the present embodiment are mainly described and the same points as in Embodiment 1 are not described. The components having the same or a similar function have the same reference numerals in both the present embodiment and Embodiment 1, and such components are not described in the present embodiment. The present embodiment is substantially the same as Embodiment 1 except for the points described below.

Figure 6:
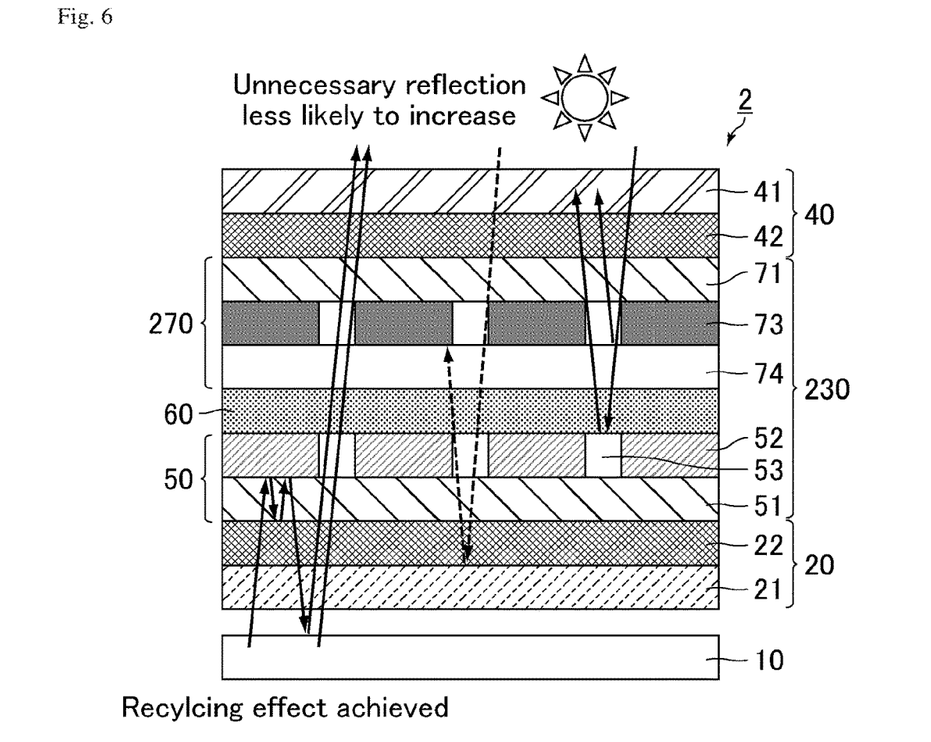
FIG. 6 is a schematic cross-sectional view of a liquid crystal display device of Embodiment 2.

FIG. 6 is a schematic cross-sectional view of a liquid crystal display device of Embodiment 2.

As illustrated in FIG. 6, a liquid crystal display device 2 of the present embodiment includes, in the given order, the backlight 10, the first circular polarizer 20, a liquid crystal panel 230 provided with no color filter, and the second circular polarizer 40. The first circular polarizer 20 is a reflective circular polarizer including a reflective linear polarizer 21 and a λ/4 plate 22 disposed adjacent to the reflective linear polarizer 21. The liquid crystal panel 230 has an aperture ratio of 39% or lower. Thus, the liquid crystal display device 2 is substantially the same as the liquid crystal display device of Embodiment 1 except that it includes the liquid crystal panel 230 provided with no color filter instead of the liquid crystal panel provided with color filters of two or more colors and that the liquid crystal panel 230 has an aperture ratio of 39% or lower.

Thus, also in the present embodiment, the first circular polarizer 20 is a reflective circular polarizer including the reflective linear polarizer 21 and the λ/4 plate 22 disposed adjacent to the reflective linear polarizer 21 (Configuration (1)). The effects achieved by Configuration (1) are the same as those in Embodiment 1.

Since the liquid crystal display device 2 includes the backlight 10, the liquid crystal panel 230 operates in a transmissive or semi-reflective and semi-transmissive (transflective) display mode, preferably a transmissive mode from the same point of view as in Embodiment 1 (Configuration (2)).

In contrast, in the present embodiment, the aperture ratio of the liquid crystal panel 230 is 39% or lower (hereinafter, this configuration is also referred to as Configuration (3-2)), which is lower than that in Embodiment 1. This is because the liquid crystal panel 230 is provided with no color filter (hereinafter, this configuration is referred to as Configuration (4-2)) and the present embodiment cannot achieve an effect of reducing unnecessary reflection owing to color filters of two or more colors.

Configuration (3-2) leads to the same effects as in Embodiment 1. In other words, setting the aperture ratio of the liquid crystal panel 230 to a low value, specifically 39% or lower in the present embodiment, enables a reduction in unnecessary reflection due to the back-side first circular polarizer 20.

The present embodiment may satisfy any other appropriate configurations in addition to Configurations (1), (3-2), and (4-2), and any of the configurations mentioned in Embodiment 1 may be applied as appropriate. It should be noted that each pixel needs not to be divided into subpixels of multiple colors in the present embodiment. Thus, each pixel is provided with at least one TFT element and at least one transparent electrode 53. The metals 52 and the black matrix (black mask) 73 are disposed in a non-opening region such as a boundary region between pixels. The viewer-side substrate 270 of the liquid crystal panel 30 is provided with the black matrix 73, but provided with no color filter.

In the present embodiment, the aperture ratio of the liquid crystal panel 30 may be any value that is 39% or lower, and is preferably 27% or lower, more preferably 14% or lower. In the present embodiment, setting the aperture ratio to 27% or lower and to 14% or lower respectively enables the internal reflectance to be substantially half or less and to be substantially ¼ or less the internal reflectance in the case of using absorptive linear polarizers instead of using the circular polarizers 20 and 40.

Also in the present embodiment, like Embodiment 1, the lower limit of the aperture ratio of the liquid crystal panel 30 may be any value, and is preferably 5% or higher, more preferably 10% or higher, particularly preferably 15% or higher.

From the same point of view as in Embodiment 1, the second circular polarizer 40 is preferably an absorptive circular polarizer including an absorptive linear polarizer 41 and a λ/4 plate 42 disposed adjacent to the absorptive linear polarizer 41. In a plan view, the in-plane slow axis of the λ/4 plate 42 preferably forms an angle of 40° to 50°, more preferably 43° to 47°, particularly preferably 44° to 46°, with the transmission axis of the absorptive linear polarizer 41. Further, in a plan view, the in-plane slow axis of the λ/4 plate 42 is substantially perpendicular to the in-plane slow axis of the λ/4 plate 22. More specifically, in a plan view, the in-plane slow axis of the λ/4 plate 42 and the in-plane slow axis of the λ/4 plate 22 form an angle of 80° to 100° (preferably 85° to 95°, more preferably 88° to 92°). Then, the first circular polarizer 20 and the second circular polarizer 40 may be disposed in parallel-Nicols, but is usually disposed in crossed Nicols. In the latter case, more specifically, the transmission axis of the reflective linear polarizer 21 and the transmission axis of the absorptive linear polarizer 41 usually form an angle of 80° to 100° (preferably 85° to 95°, more preferably 88° to) 92° in a plan view.

(Evaluation 2)

Two liquid crystal panels (fifth and sixth liquid crystal panels) having different aperture ratios and panel transmittances were prepared as shown in the following Table 3. The fifth and sixth liquid crystal panels are each provided with no color filter. The aperture ratios and panel transmittances thereof were as shown in Table 3, which were different from each other.

TABLE 3

| Lliquid crystal panel | Aperture ratio (%) | Color filters | Panel transmittance (%) |
|---|---|---|---|
| 5 | 32 | Absent | 29.1 |
| 6 | 55 | Absent | 50.1 |

Figure 7:
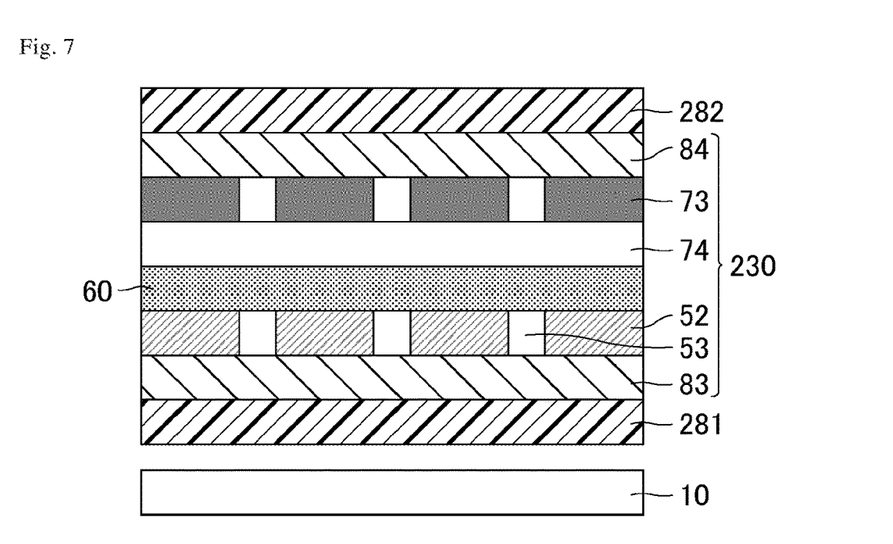
FIG. 7 is a schematic cross-sectional view of a liquid crystal display device used in Evaluation 2.

FIG. 7 is a schematic cross-sectional view of a liquid crystal display device used in Evaluation 2.

Fifth and sixth liquid crystal panels 230 are VA-mode transmissive liquid crystal panels. As illustrated in FIG. 7, each included the glass substrate (also referred to as a back-side substrate) 83 provided with multiple TFT elements (not illustrated), the metals 52 for conductive components such as signal lines and electrodes of the TFT elements, and the transparent electrodes 53 serving as pixel electrodes; the glass substrate (also referred to as a viewer-side substrate) 84 provided with the black matrix 73 and the transparent electrode 74 serving as a common electrode; and the liquid crystal layer 60 sealed between the viewer-side substrate 83 and the back-side substrate 84. Although not illustrated, the liquid crystal panels 230 each included, on the liquid crystal layer 60 side surface of each of the substrates 83 and 84, an alignment film which aligns the liquid crystal molecules in the liquid crystal layer 60 substantially perpendicularly to the surface of the corresponding substrate 83 or 84 with no voltage applied.

A polarizer 281 and a polarizer 282 were respectively attached to the back-side surface and the viewer-side surface of each liquid crystal panel 230, and then the workpiece was assembled with the backlight 10. Finally, 6 liquid crystal display devices for evaluation tests (1 device as an example and 5 devices as comparative examples) were produced. Each liquid crystal display device included, in the given order from the back side to the viewer side, the backlight 10, a first circular polarizer or a first absorptive linear polarizer serving as the back-side polarizer 281, one of the fifth and sixth liquid crystal panels 230, and a second circular polarizer or a second absorptive linear polarizer serving as the viewer-side polarizer 282.

The first circular polarizer used was a reflective circular polarizer or an absorptive circular polarizer and the second circular polarizer used was an absorptive circular polarizer. The reflective circular polarizer includes a reflective linear polarizer and a λ/4 plate disposed adjacent to the reflective linear polarizer. It was attached to the liquid crystal panel 230 such that the λ/4 plate was placed between the reflective linear polarizer and the liquid crystal panel 230. The reflective linear polarizer used was DBEF film (3M Co.). The absorptive circular polarizer includes an absorptive linear polarizer and a λ/4 plate disposed adjacent to the absorptive linear polarizer. It was attached to the liquid crystal panel 230 such that the λ/4 plate was placed between the absorptive linear polarizer and the liquid crystal panel 230. The absorptive linear polarizer used was a film obtained by stretching a polyvinyl alcohol (PVA) film adsorbing a dichroic iodine complex to prepare a polarizing film and then attaching a TAC film to each of the surfaces of the polarizing film using adhesive.

The following Table 4 shows the combinations of one of the fifth and sixth liquid crystal panels, the back-side polarizer, and the viewer-side polarizer in the respective liquid crystal display devices.

TABLE 4

| Liquid crystal panel | | Back-side polarizer | Viewer-side polarizer | Relative transmittance (%) | Internal reflectance (%) |
|---|---|---|---|---|---|
| 5 | Example 3 | Reflective circular polarizer | Absorptive circular polarizer | 98 | 1.4 |
| | Comparative Example 5-1 | Absorptive circular polarizer | Absorptive circular polarizer | 85 | 0.1 |

TABLE 4-continued

| Liquid crystal panel | | Back-side polarizer | Viewer-side polarizer | Relative transmittance (%) | Internal reflectance (%) |
|---|---|---|---|---|---|
| | Comparative Example 5-2 | Absorptive linear polarizer | Absorptive linear polarizer | 100 | 2.1 |
| 6 | Comparative Example 6 | Reflective circular polarizer | Absorptive circular polarizer | 98 | 5.6 |
| | Comparative Example 6-1 | Absorptive circular polarizer | Absorptive circular polarizer | 95 | 0.1 |
| | Comparative Example 6-2 | Absorptive linear polarizer | Absorptive linear polarizer | 100 | 2.3 |

Table 4 shows the liquid crystal display device of Example 3 had a transmittance similar to that of the liquid crystal display devices of the comparative examples using absorptive linear polarizers, and achieved the effect of recycling the light from the backlight as in the cases of using absorptive linear polarizers. In the case of using the fifth liquid crystal panel having an aperture ratio of 32%, the internal reflectance of the liquid crystal display device using a reflective circular polarizer was lower than the internal reflectance of the liquid crystal display device using absorptive linear polarizers (see Example 3 and Comparative Example 5-2).

For the respective liquid crystal panels, the following Tables 5 and 6 show the internal reflectances (A) in the cases of using a reflective circular polarizer (Examples 1 to 3, Comparative Examples 1, 2, and 6), the internal reflectances (B) of the liquid crystal display devices using absorptive linear polarizers (Comparative Examples 1-2 to 6-2), and the ratios A/B calculated from these values. Table 5 shows the data of the first to fourth liquid crystal panels provided with color filters. Table 6 shows the data of the fifth and sixth liquid crystal panels provided with no color filter. If A/B<1, the internal reflectance of the liquid crystal display device using a reflective circular polarizer is lower than the internal reflectance of the liquid crystal display device using absorptive linear polarizers.

TABLE 5

| Aperture ratio (%) | Internal reflectance A (%) | Internal reflectance B (%) | A/B (with CF) |
|---|---|---|---|
| 55 | 3.2 | 1.6 | 2 |
| 43 | 1.3 | 1.3 | 1 |
| 31 | 0.6 | 1.5 | 0.4 |
| 19 | 0.3 | 1.6 | 0.19 |

TABLE 6

| Aperture ratio (%) | Internal reflectance A (%) | Internal reflectance B (%) | A/B (without CF) |
|---|---|---|---|
| 55 | 5.6 | 2.3 | 2.4 |
| 32 | 1.4 | 2.1 | 0.67 |

Figure 8:
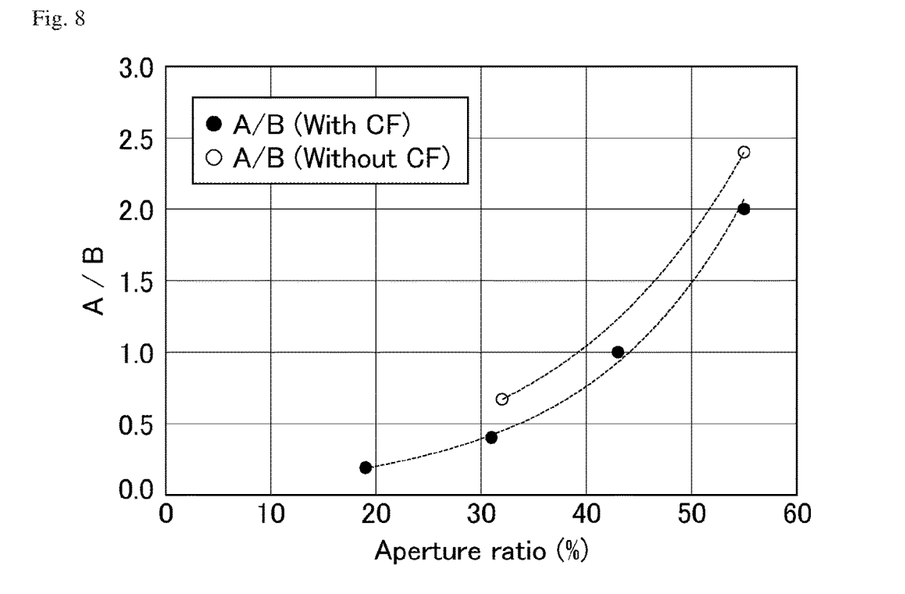
FIG. 8 is a graph illustrating the relationship between the aperture ratio and the ratio A/B in liquid crystal panels provided with or without color filters (CF).

FIG. 8 is a graph illustrating the relationship between the aperture ratio and the ratio A/B in liquid crystal panels provided with or without color filters (CF).

As illustrated in FIG. 8, curve fitting was performed in the cases of the first to fourth liquid crystal panels provided with color filters, which showed an exponential approximate curve best fits the plots. The aperture ratios giving the ratios A/B of 0.5 and 0.25 were read from the resulting curve, and were respectively about 34% and about 23%. Thus, in the case of using color filters and a reflective circular polarizer, setting the aperture ratio to 34% or lower and to 23% or lower respectively enables the internal reflectance to be substantially half or less and to be substantially ¼ or less the internal reflectance in the case of using color filters and absorptive linear polarizers.

Also in the case of the fifth and sixth liquid crystal panels provided with no color filter, the relationship between the ratio A/B and the aperture ratio seems to be approximated by an exponential function in the same manner as in the case of the first to fourth liquid crystal panels provided with color filters. This is because these cases are different only in transmittance due to the presence or absence of color filters and the respective liquid crystal panels transmit the light in both cases. Then, an exponential approximate curve was determined for the fifth and sixth liquid crystal panels provided with no color filter. The aperture ratios giving the ratios A/B of 1, 0.5, and 0.25 were read from the resulting curve, and were respectively about 39% (more specifically, about 39.2%), about 26%, and about 14%. Thus, in the case of using a reflective circular polarizer without color filters, setting the aperture ratio to 39% or lower enables the internal reflectance to be lower than that in the case of using absorptive linear polarizers without color filters. Further, in the case of using a reflective circular polarizer without color filters, setting the aperture ratio to 34% or lower and to 23% or lower respectively enables the internal reflectance to be substantially half or less and to be substantially ¼ or less the internal reflectance in the case of using absorptive linear polarizers without color filters.

The above results demonstrated that setting the aperture ratio of a liquid crystal panel provided with no color filter to 39% or lower enables the internal reflection of a liquid crystal display device using a reflective circular polarizer to be lower than that of a liquid crystal display device using absorptive linear polarizers. As a result, the liquid crystal display device of the present embodiment can improve the light use efficiency of a liquid crystal display device using a circular polarizer while minimizing an increment in internal reflection.

REFERENCE SIGNS LIST

1, 2: liquid crystal display device
10: backlight
20: first circular polarizer
21: reflective linear polarizer
22: λ/4 plate
30, 230: liquid crystal panel
31, 32: opening region
40: second circular polarizer 41: absorptive linear polarizer
42: λ/4 plate
50: substrate
51: insulating substrate
52: metal
53: transparent electrode
60: liquid crystal layer
70, 270: substrate
71: insulating substrate
72: color filter
73: black matrix (black mask)
74: transparent electrode
81, 82, 281, 282: polarizer
83, 84: glass substrate

The invention claimed is:

1. A transmissive liquid crystal display device comprising, in the given order:
a backlight;
a first circular polarizer;
a liquid crystal panel; and
a second circular polarizer,
the first circular polarizer being a reflective circular polarizer including a reflective linear polarizer and a λ/4 plate disposed adjacent to the reflective linear polarizer,
the liquid crystal panel having an aperture ratio lower than 43%, the aperture ratio defined as a percentage of an area of a region through which light passes relative to a whole area of one pixel when the liquid crystal panel with no polarizer disposed on either of a backlight-side surface thereof and a viewer-side surface thereof is viewed from a normal direction of the backlight-side surface or viewer-side surface,
the liquid crystal display panel operating in a transmissive mode and not in a transflective display mode,
the liquid crystal display panel including a first substrate, a liquid crystal layer, and a second substrate in the given order from the backlight side,
the first substrate being provided with a first insulating substrate, reflectors disposed on the liquid crystal layer side of the first insulating substrate and spaced from each other in a cross-sectional view, and transparent electrodes, each transparent electrode disposed between two reflectors disposed next to each other in the cross-sectional view,
the second substrate being provided with a second insulating substrate, color filters of at least two colors disposed on the liquid crystal layer side of the second insulating substrate and spaced from each other in the cross-sectional view, and a light absorber disposed between two color filters of different colors in the cross-sectional view.

2. The transmissive liquid crystal display device according to claim 1,
wherein the second circular polarizer is an absorptive circular polarizer.

3. A liquid crystal display device comprising, in the given order:
a backlight;
a first circular polarizer;
a liquid crystal panel provided with no color filter; and
a second circular polarizer,
the first circular polarizer being a reflective circular polarizer including a reflective linear polarizer and a λ/4 plate disposed adjacent to the reflective linear polarizer,
the liquid crystal panel having an aperture ratio of 39% or lower, the aperture ratio being defined as a percentage of an area of a region through which light passes relative to a whole area of one pixel when the liquid crystal panel with no polarizer disposed on either of a backlight-side surface thereof and a viewer-side surface thereof is viewed from a normal direction of the backlight-side surface or viewer-side surface,
the liquid crystal display panel operating not in the transflective display mode but in the transmissive mode,
the liquid crystal display panel including a first substrate, a liquid crystal layer, and a second substrate in the given order from the backlight side,
the first substrate being provided with a first insulating substrate, reflectors disposed on the liquid crystal layer side of the first insulating substrate and spaced from each other in a cross-sectional view, and transparent electrodes, each transparent electrode disposed between two reflectors disposed next to each other in the cross-sectional view,
the second substrate being provided with a second insulating substrate and a light absorber disposed on the liquid crystal layer side of the second insulating substrate.

4. The transmissive liquid crystal display device according to claim 3,
wherein the second circular polarizer is an absorptive circular polarizer.

5. The transmissive liquid crystal display device according to claim 1,
wherein the liquid crystal display panel has an aperture ratio of 23% or lower.

6. The transmissive liquid crystal display device according to claim 3,
wherein the liquid crystal display panel has an aperture ratio of 27% or lower.

7. The transmissive liquid crystal display device according to claim 6,
wherein the liquid crystal display panel has an aperture ratio of 14% or lower.

* * * * *